United States Patent
Oesterling

(10) Patent No.: US 7,466,218 B2
(45) Date of Patent: Dec. 16, 2008

(54) SYSTEM AND METHOD OF CONTROLLING VEHICLE COMMUNICATIONS DURING EMERGENCY CONDITIONS

(75) Inventor: Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/066,677

(22) Filed: Feb. 25, 2005

(65) Prior Publication Data

US 2006/0194566 A1 Aug. 31, 2006

(51) Int. Cl.
*B60R 25/10* (2006.01)

(52) U.S. Cl. .............................. 340/426.18; 340/426.19; 340/426.2; 455/99

(58) Field of Classification Search .............. 340/425.5, 340/438, 426.18, 426.2, 426.21, 426.19, 340/539.19; 455/99, 422.1
See application file for complete search history.

(56) References Cited

U.S. PATENT DOCUMENTS

| | | | | |
|---|---|---|---|---|
| 4,257,038 A | * | 3/1981 | Rounds et al. | 340/539.16 |
| 5,561,851 A | * | 10/1996 | Hubbell et al. | 455/512 |
| 5,781,101 A | * | 7/1998 | Stephen et al. | 340/286.02 |
| 5,933,080 A | * | 8/1999 | Nojima | 340/426.19 |
| 6,035,187 A | * | 3/2000 | Franza | 455/404.1 |
| 2001/0034235 A1 | * | 10/2001 | Froula | 455/446 |
| 2002/0036566 A1 | * | 3/2002 | Isobe | 340/426 |
| 2003/0117982 A1 | * | 6/2003 | Minnick | 370/337 |
| 2004/0063459 A1 | * | 4/2004 | Yamashita et al. | 455/556.1 |
| 2004/0145459 A1 | * | 7/2004 | Himmelstein | 340/426.19 |

FOREIGN PATENT DOCUMENTS

GB 2300996 * 11/1996

* cited by examiner

*Primary Examiner*—Brent Swarthout

(57) ABSTRACT

A method and a system for controlling communications between a vehicle telematics device and a call center. The method includes determining an emergency condition. A communications priority is determined. Information is selectively communicated between the vehicle telematics device and the call center based on the emergency condition and the communications priority. The system includes means for determining an emergency condition, and means for determining a communications priority. The system further includes means for selectively communicating information between the vehicle telematics device and the call center based on the emergency condition and the communications priority.

21 Claims, 4 Drawing Sheets

| Event Type 305 | Priority Value 310 |
|---|---|
| Airbag Deployment 315 | Priority One 320 |
| Emergency Button press 325 | Priority One 330 |
| Voice Call 335 | Priority Two 340 |
| Remaining Oil Life 345 | Priority Three 350 |
| Maintenance Status 355 | Priority Three 360 |

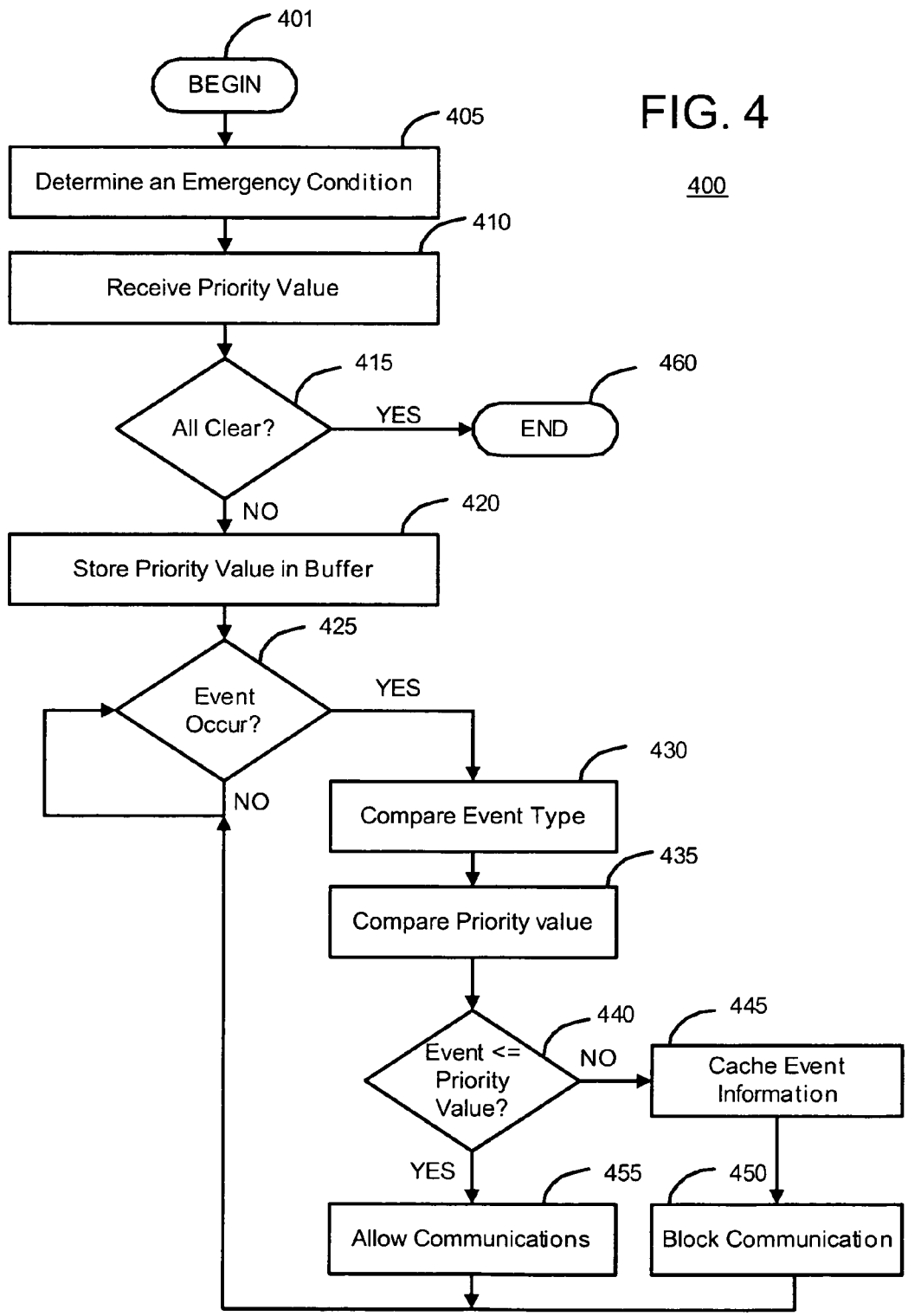

SYSTEM AND METHOD OF CONTROLLING VEHICLE COMMUNICATIONS DURING EMERGENCY CONDITIONS

FIELD OF THE INVENTION

This invention relates generally to data transmissions over a wireless communication system. More specifically, the invention relates to a strategy for prioritizing vehicle communications during emergency conditions.

BACKGROUND OF THE INVENTION

Telematic communication units (TCUs) include devices such as cellular phones (digital and analog), personal data assistants (PDAs), Global Positioning System (GPS) devices, and on-board Mobile Vehicle Communication Units (MVCUs). TCUs have made it possible for an entity to send and receive voice, data, and facsimile (FAX) communications from virtually anywhere on earth. Many passenger vehicles now incorporate an integrated communication system, such as an MVCU, providing a variety of fee-based subscription services in a mobile environment. The MVCU is typically a vehicle telematics device including a cellular radio, satellite transceiver, and/or global positioning capabilities. Communication through a carrier service may be initiated at the MVCU at turn-on or through manual or voice command phone number entry. Typically, a radio communication link is established between the MVCU and a call center through a wireless networkwireless network, using a node of the wireless network in the vicinity of the MVCU. In wireless telephone systems, a node is commonly referred to as a "wireless base station." Once a radio communication link between the MVCU and the wireless base station has been established, the base station may utilize a combination of additional wireless stations, conventional telephone wire line networks, and possibly even satellite systems to connect the MVCU to the number to the call center.

During the course of normal communication loads, wireless network node(s) are typically more than capable of handling the volume of simultaneously established links. In some instances, however, the link volume may surge and/or the capacity of the network may be diminished so as to overburden wireless network node(s). As such, a transmission state between the MVCU and the wireless network node(s) may be compromised. Some on-going communications may be dropped and the establishment of novel connections may be prohibited. For example, a localized emergency may result in a sudden and short-lived burst in TCU communications, thereby saturating wireless network node(s) only temporarily. As a more extreme example, a wide-spread natural disaster (e.g., hurricane, earthquake, and the like) may result in a sudden and long-lived burst in TCU communications, thereby saturating wireless network node(s) indefinitely. To exacerbate the situation, the natural disaster may inhibit, cripple, or even destroy some of the wireless network components (e.g., nodes, lines, computers, power generators, etc.). In either case, vital communications may be hindered at a time when they are critically needed.

Vehicles having telematics functionality may include a multitude of sensors coupled to the MVCU as known in the art. Upon sensing a predetermined event, the MVCU may contact the control center. The events may range in seriousness from low oil or fuel levels, to a flat tire, to an emergency call or vehicle impact (i.e., ranging between non-emergency and emergency events). Some events may be detected automatically whereas some may be triggered, for example, by depressing an emergency button. As previously described, communications between the MVCU and the call center during the course of normal loads can be typically handled without incident. Should a portion of the wireless network become overburdened, certain events may not be communicated between the MVCU and the call center. Further, ongoing communication of so-called non-emergency events between the MVCU and the call center may preclude calls of a more serious nature from getting through. As such, it would be desirable to provide a strategy for prioritizing vehicle communications so as to allow more critical communications to be permitted.

It is an object of this invention, therefore, to provide a strategy for controlling vehicle communications during emergency situations, and to overcome the deficiencies and obstacles described above.

SUMMARY OF THE INVENTION

One aspect of the invention provides a method of controlling communications between a vehicle telematics device and a call center. The method includes determining an emergency condition. A communications priority is determined. Information is communicated between the vehicle telematics device and the call center based on the emergency condition and the communications priority.

Another aspect of the invention provides a computer usable medium including a program for controlling communications between a vehicle telematics device and a call center. The computer usable medium includes computer readable program code for determining an emergency condition, and computer readable program code for determining a communications priority. The medium further includes computer readable program code for communicating information between the vehicle telematics device and the call center based on the emergency condition and the communications priority.

Another aspect of the invention provides a system for controlling communications between a vehicle telematics device and a call center. The system includes means for determining an emergency condition, and means for determining a communications priority. The system further includes means for communicating information between the vehicle telematics device and the call center based on the emergency condition and the communications priority.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a schematic diagram representative of an embodiment of a data table for a method of controlling vehicle communications in a mobile vehicle using a satellite radio broadcast system, in accordance with the present invention; and FIG. 4 is a flow chart representation of an embodiment of a method for controlling vehicle communications in a mobile vehicle using a satellite radio system in accordance with the present invention.

DETAILED DESCRIPTION OF THE PRESENTLY PREFERRED EMBODIMENTS

Figure 1:
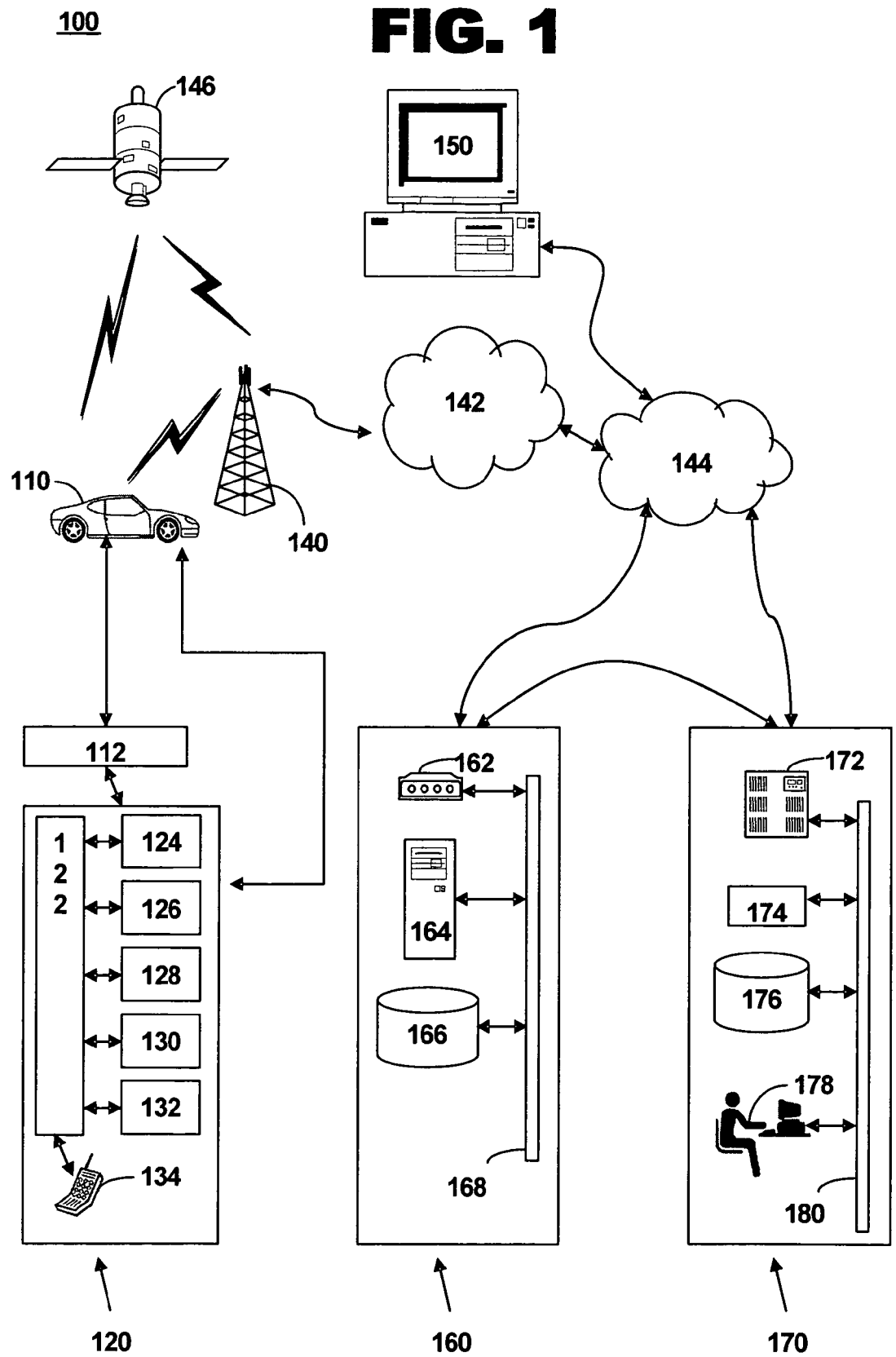
FIG. 1 is an illustration of one embodiment of a system for controlling communications in a mobile vehicle using a satellite-radio broadcast system, in accordance with one embodiment of the present invention.

FIG. 1 is a schematic diagram of a mobile vehicle communications system for prioritizing vehicle communications in accordance with one embodiment of the present invention and shown generally by numeral 100. Mobile vehicle communication system (MVCS) 100 includes a mobile vehicle communication unit (MVCU) 110; a vehicle communication network 112; a telematics unit 120; one or more wireless carrier systems 140; one or more communication networks 142; one or more land networks 144; one or more satellite broadcast systems 146; one or more client, personal or user computers 150; one or more web-hosting portals 160; and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems within MVCU 110 to perform various functions such as unlocking a door, opening the trunk, setting personal comfort settings, receiving sensor input, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

MVCU 110 receives various digital/discrete and/or analog/continuous signals from numerous sensors (not shown) positioned about the vehicle. In one embodiment, the sensors include those sensing a wide variety of vehicle conditions including, but not limited to, engine and transmission (e.g., temperature and function), oil (e.g., temperature, level, and viscosity), cooling fluid (e.g., temperatures and level), tire pressure and wear, collisions, security, and ambient condition factors (e.g., temperature, humidity, and barometric pressure). The signals from the sensors are buffered and low-pass filtered through analog low-pass filter(s) to reduce signal noise as known in the art.

MVCU 110 may be coupled to the call center 170 to provide a variety of communication services. A request for a communication with the call center (e.g., by depressing an assistance button) generates a message including a priority factor (discussed below). The message is communicated to the control center 170 when it is determined that it is appropriate (described below).

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS). Satellite broadcast system 146 may broadcast over on or more XM radio channels from the call center 170 to the MVCU 110 as understood in the art.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, data packets received by telematics unit 120 are implemented by processor 122. In another example, data packets received by telematics unit 120 are communicated to modified MVCUs within the MVCS.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 transmits digital data to and from modem 162, data that is then transferred to web server 164. In one embodiment, modem 162 resides inside web server 164. Land network 144 transmits data communications between web-hosting portal 160 and call center 170.

Web server 164 receives user-preference data from computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In another embodiment, the call center is a voice call center, providing verbal communications between an advisor in the call center and a subscriber in a mobile vehicle. In yet another embodiment, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
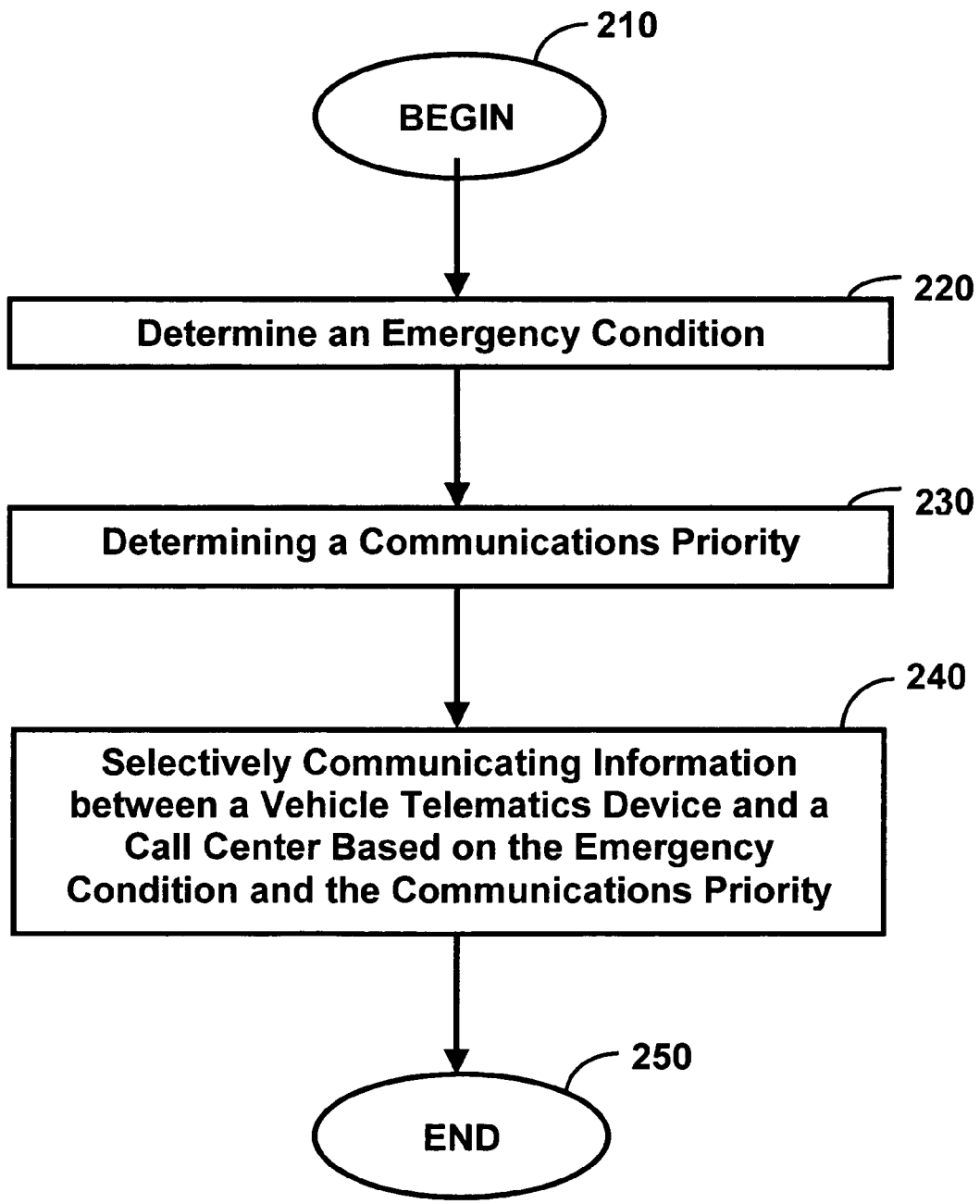
FIG. 2 is a flow diagram of one embodiment of a method of controlling communications in a mobile vehicle using a satellite-radio broadcast system, in accordance with one embodiment of the present invention.

FIG. 2 illustrates a flowchart 200 representative of one embodiment of a method controlling communications in a mobile vehicle using a satellite-radio broadcast system. Method 200 begins at 210. The present invention may take the form of a computer usable medium including a program for prioritizing vehicle communications. The program, stored in the computer usable medium, includes computer program code for executing the method steps described and illustrated in FIG. 2. The program may be stored and executed by the MVCU 110, call center 170, and associated (sub-) components as needed to prioritize vehicle communications.

At step 220, an emergency condition is determined. As defined herein, the term "emergency condition" is defined as one or more events that may result in an increase in communications volume and/or a decrease in the functional capacity of a wireless area network. Examples of emergency conditions include, but are not limited to, natural disasters (e.g., hurricanes, earthquakes, floods, tornados, etc.), non-natural disasters (e.g., fires, riots, terrorist acts, etc.), and other conditions that usually require reliable communication of high priority messages. Those skilled in the art will recognize that numerous other conditions may affect communications between the MVCU 110 and the call center 170, and may therefore produce or affect emergency conditions.

In one embodiment, the emergency condition is determined at the call center 170. For example, circumstances that may lead up to or are currently contributing to an emergency condition may be communicated to the call center 170 (i.e., the call center 170 may receive input feeds from a weather service, civil defense service, news service, television, radio, phone calls, reports, sensors, etc.). Determination of the emergency condition may also include determining the type of condition (e.g., fire, flood, riot, etc.), its geographic location, severity, motion, time-frame, and the like, and how it would affect overall communications systems. Preferably, the determined emergency condition would be authenticated by one or more additional sources.

In another embodiment, the emergency condition may be determined at a location other than the call center 170, such as the vehicle itself (i.e., by using appropriate sensors known in the art and/or by the vehicle occupants). In such an instance, the emergency condition may be communicated to the call center 170 for alerting other vehicles, personnel, authorities, or for other purpose(s). Further, the determined emergency condition may be validated and further defined by numerous separate vehicular determinations communicated to the call center 170.

At step 230, a communications priority is determined. In one embodiment, the communications priority is determined at the call center 170. Communications priorities may be pre-defined and may vary based on the nature, size, and configuration of the wireless network. For example, non-critical vehicle operational condition data (e.g., remaining oil life, tire pressure, engine temperature, etc.) may be determined as low-priority communications. Additionally, some voice activated calls placed to automatons via the MVCU 110 (e.g., stock quote requests, sports scores, etc.) may be determined as low-priority communications. Alternatively, critical vehicle operational conditions and emergency calls may be determined as high-priority communications. Those skilled in the art will recognize that numerous factors may be involved in the determination of a communications priority based on a given emergency condition. Further, additional tiers (e.g., more than two) of communications priorities may be provided wherein higher priority communications would be preferably communicated before lower priority communications.

At step 240, information (e.g., vehicle sensor data, other data, geographic positioning of the vehicle, voice calls, etc.) is selectively communicated between the MVCU 110 and the call center 170 based on the emergency condition and the communications priority. In one embodiment, if there is not an emergency condition present (relative to a given vehicle), a multitude of both low and high priority communications are free to occur between the MVCU 110 and the call center 170. For example, the vehicle may intermittently communicate sensor data information commonly referred to as vehicle data upload (VDU) events. In addition, both non-emergency and emergency voice calls are also free to occur between the MVCU 110 and the call center 170.

In one embodiment, when an emergency condition is determined, the call center 170 communicates the emergency condition and the communications priority to a vehicle located at or near the emergency condition (i.e., as the vehicle's location was determined by the GPS unit 126 and previously communicated to the call center 170). Call center 170 may communicate the emergency condition and the communications priority to the vehicle via a satellite radio broadcast (e.g., an XM radio broadcast) or a short-range network broadcast, (e.g., 802.11). A vehicle present at or near the emergency condition may inhibit (i.e., selectively restrict incoming and/or outgoing) low-priority communications based on the emergency condition and the communications priority to allow higher-priority communications precedence. In the event that a low-priority communication is established between the MVCU 110 and the call center 170, the call center 170 may direct the vehicle to inhibit future low-priority communications for a certain time period and/or until further notice. As the low-priority communications are inhibited from numerous vehicles during an emergency condition, fewer calls are placed on the regional wireless network(s). As such, high-priority communications (e.g., emergency calls, call to loved ones, etc.) are more likely to be completed.

In one embodiment, the inhibited low-priority communications may be stored in a memory portion or other storage device at the MVCU 110 for later communication. When it is determined that an emergency condition no longer exists or at least has diminished to a certain point, normal communications between vehicles and the call center 170 may resume and the stored communications sent. The cessation of an emergency condition may be communicated from the call center 170 to the MVCU 110 using any of the previously describe communications methods. The method terminates at step 250.

FIG. 3 provides a schematic diagram 300 representative of an embodiment of a data table for a method controlling vehicle communications in a mobile vehicle using a satellite radio broadcast system. FIG. 3 provides a two column data table containing an event type 305 and a communication priority value 310. Each event type 305 is assigned a communication priority value 310. For example, an airbag deployment event 315 has an associated communication priority one value 320, where a communication priority one value 320 is the highest priority available. In this embodiment, an emergency button press event 325 also has a communication priority one value 330.

Further, in this embodiment, a voice channel call 335 has a communication priority two value 340. A communication priority two value is of lesser priority than a priority one value. Maintenance events, such as a remaining oil life event 345 and a maintenance status event 355, have communication priority three values 350 and 360, respectively. A communication priority three value is of lesser priority than a communication priority two value, thus establishing a hierarchy of communication priority values. Those with skill in the art will recognize that there are myriad other event types that may be contained in a data table for use with this invention.

FIG. 4 provides a flow chart 400 representation of an embodiment of a method for controlling vehicle communications in a mobile vehicle using a satellite radio system. Method 400 begins at 401.

In step 405, an emergency condition is determined, as in step 220 in FIG. 2. In the present embodiment, and responsive to the determination step 405, the call center (FIG. 1, 170) communicates the emergency condition and a communications priority value to the MVCU (FIG. 1, 110) via a satellite radio broadcast (e.g. an XM radio broadcast) or short-range network broadcast (e.g. 802.11). In one embodiment a communication priority value may be comprised of an integer with a value of one, two, or three. In another embodiment the communication priority value may be represented by an eight bit byte, allowing $2^8$ or 256 priority codes. In other embodiments the communication priority value may be represented by a sixteen, thirty two, or sixty four bit byte.

A communication priority value is received at the MVCU (FIG. 1, 110) in step 410 and the method advances to step 415. In this embodiment, a communication priority value of zero indicates that an All Clear signal has been issued, ending the method at step 460. If an All Clear signal has not been issued, then the method advances to step 420 where the communication priority value is stored in a communication priority value buffer. In one embodiment, the communication priority value may be stored in an integer variable. In another embodiment, the communication priority code may be stored in an eight, sixteen, thirty two, or sixty four bit byte.

In step 425, the computer program code, stored within computer usable medium executed by the MCVU (FIG. 1, 110) detects the occurrence of a vehicle event. If an event occurs, the vehicle event is compared in step 430 to the event types listed in the table shown in FIG. 3, or similar other table. If the vehicle event matches an event listed in the table shown in FIG. 3, the method advances to step 435. If no vehicle event occurs, the method remains in step 425.

Step 435 compares the priority value received via the satellite radio broadcast (e.g. an XM radio broadcast) or short-range network broadcast (e.g. 802.11) stored in the buffer recited in step 420 to the communication priority associated with the event type shown in FIG. 3.

Step 440 tests whether the result of the comparison of the communication priority value stored in the buffer recited in step 420 is less than or equal to the communication priority value associated with the event type listed in FIG. 3. If the communication priority value stored in the buffer recited in step 420 is less than or equal to the communication priority value associated with the event type listed in FIG. 3, then the method advances to step 455 where communication is allowed and will not be inhibited. The method then returns to block 425. In one embodiment, if a communication priority value is one, then airbag deployment calls (FIG. 3, 315) and emergency button press calls (FIG, 3, 325) will not be inhibited. In another embodiment, if a communication priority value is two, then airbag deployment calls (FIG. 3, 315), emergency button press calls (FIG, 3, 325), and voice calls (FIG. 3, 335) will not be inhibited.

If the communication priority value stored in the buffer recited in step 420 is not less than or equal to the communication priority value associated with the event type listed in FIG. 3 then the method advances to step 445. In one embodiment, step 445 places the event information in a cache for later retrieval. For example, if an All Clear is issued the event information placed in the cache is available for examination and further action. The method then advances to step 450, where communication for the event is inhibited and any communication attempt for the event will be inhibited. The method then returns to step 425.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of controlling vehicle communications, the method comprising:
   determining an emergency condition that hinders wireless communication from a vehicle;
   detecting occurrence of a vehicle event on the vehicle;

determining a communications priority associated with the vehicle event; and selectively allowing or blocking wireless communication relating to the vehicle event from the vehicle during the emergency condition based on the communications priority;

wherein the step of selectively allowing or blocking wireless communication comprises determining a vehicle geographic location and selectively allowing or blocking wireless communication based on the geographic location and communications priority.

2. The method of claim 1 wherein the emergency condition is determined at the call center.

3. The method of claim 1 wherein the emergency condition is determined at a vehicle.

4. The method of claim 1 wherein the step of selectively allowing or blocking wireless communication comprises inhibiting low-priority communications.

5. The method of claim 1 further comprising communicating at least one of the determined emergency condition and the determined communications priority, from the call center to the vehicle.

6. The method of claim 1 further comprising authenticating the determined emergency condition.

7. A method of controlling vehicle communications, the method comprising:
determining an emergency condition that hinders wireless communication from a vehicle;
detecting occurrence of a vehicle event on the vehicle;
determining a communications priority associated with the vehicle event;
selectively allowing or blocking wireless communication relating to the vehicle event from the vehicle during the emergency condition based on the communications priority; and
storing information concerning the vehicle event in response to blocking of a wireless communication.

8. The method of claim 1 further comprising resuming wireless communications between the vehicle and a call center without regard to the communications priority after the emergency condition has subsided.

9. The method of claim 1 wherein the step of selectively allowing or blocking wireless communication further comprises selectively allowing or blocking wireless communication from a telematics unit on the vehicle to a call center.

10. The method of claim 1 further comprising the step of providing emergency condition information to the vehicle over a satellite radio broadcast and wherein the step of selectively allowing or blocking wireless communication further comprises selectively allowing or blocking wireless communications over a mobile telephone network.

11. A method of controlling vehicle communications, the method comprising:
determining an emergency condition that hinders wireless communication from a vehicle;
providing emergency condition information to the vehicle over a satellite radio broadcast;
detecting occurrence of a vehicle event on the vehicle, wherein the vehicle event is related to a vehicle condition;
determining a communications priority associated with the vehicle event; and
selectively allowing or blocking wireless communication relating to the vehicle event from the vehicle over a mobile telephone network during the emergency condition based on the communications priority;
wherein the step of providing emergency condition information further comprises providing a communications priority value to the vehicle via the satellite radio broadcast.

12. The method of claim 10 further comprising the step of determining a communications priority value, comparing the communications priority of the vehicle event with the communications priority value, and selectively allowing or blocking wireless communication based on the comparison.

13. A method of controlling vehicle communications, comprising the steps of:
(a) determining occurrence of an emergency condition;
(b) notifying the vehicle of the emergency condition via a satellite radio broadcast; and
(c) selectively allowing or blocking cellular telephone calls from a telematics unit in the vehicle to a mobile telephone system based on the emergency condition.

14. The method of claim 13, wherein step (b) further comprises sending data to the vehicle over a satellite radio channel.

15. The method of claim 13, wherein step (c) further comprises detecting a vehicle event, obtaining a communications priority associated with the vehicle event, and selectively allowing or blocking a cellular telephone call from the telematics unit based on the communications priority.

16. The method of claim 15, further comprising the step of obtaining a communications priority value associated with the emergency condition, and wherein step (c) further comprises comparing the communications priority of the vehicle event with the communications priority value, and selectively allowing or blocking cellular telephone calls from the telematics unit based on the comparison.

17. A method of controlling vehicle communications, comprising the steps of:
(a) notifying a vehicle telematics unit of an emergency condition;
(b) detecting a vehicle event for which information related to the condition of the vehicle is to be reported to the call center via wireless communication from the vehicle telematics unit;
(c) determining a communications priority associated with the vehicle event; and
(d) selectively allowing or blocking wireless communication from the vehicle telematics unit to the call center to report the information, wherein determination of whether to allow or block the wireless communication is made using the communications priority;
wherein step (a) further comprises providing a communications priority value to the vehicle telematics unit when notifying it of the emergency condition.

18. The method of claim 17, wherein the vehicle event is one of a plurality of different events that includes an air bag deployment event and a remaining oil life event.

19. The method of claim 17, wherein step (a) further comprises notifying the vehicle telematics unit via a cellular telephone network.

20. The method of claim 17, wherein step (a) further comprises notifying the vehicle telematics unit via satellite transmission, and wherein step (d) further comprises selectively allowing or blocking wireless communication of the information via cellular communication.

21. The method of claim 17, further comprising the step of storing the information related to the vehicle condition if the wireless communication is blocked.

* * * * *